(12) United States Patent
Leung

(10) Patent No.: US 6,781,955 B2
(45) Date of Patent: Aug. 24, 2004

(54) CALLING SERVICE OF A VOIP DEVICE IN A VLAN ENVIRONMENT

(75) Inventor: Mun Keung Leung, Redwood City, CA (US)

(73) Assignee: Ericsson Inc., Plano, TX (US)

( * ) Notice: Subject to any disclaimer, the term of this patent is extended or adjusted under 35 U.S.C. 154(b) by 700 days.

(21) Appl. No.: 09/752,005

(22) Filed: Dec. 29, 2000

(65) Prior Publication Data

US 2002/0087711 A1 Jul. 4, 2002

(51) Int. Cl.$^7$ ............................................... G01R 31/08
(52) U.S. Cl. ........................................ 370/232; 370/253
(58) Field of Search ................................. 370/253, 232, 370/233, 234, 229, 230

(56) References Cited

U.S. PATENT DOCUMENTS 6,061,334 A * 5/2000 Berlovitch et al. ......... 370/255

FOREIGN PATENT DOCUMENTS

WO          WO 00 60826 A     10/2000

OTHER PUBLICATIONS

Jong S G et al: "Algorithms on dynamic priority scheduling for heterogenous traffic in ATM" Local Computer Networks, 1993., Proceedings., 18th Conference on Minneapolis, MN USA Sep. 19–22 1993, Los Alamitos, CA, USA, IEEE Comput. Soc, 19 Sep. 1993 (1993–09–19), pp. 380–387, XP010224406 ISBN: 0–8186–4510–5 * sections 2,3 *.

* cited by examiner

*Primary Examiner*—Douglas Olms
*Assistant Examiner*—Robert W. Wilson (57) ABSTRACT

A method for optimizing call service in a VLAN including at least one Voice over Internet Protocol device involves determining the current traffic levels of the VLAN, then adjusting the priority handling of data packets in the VLAN in relationship to current traffic levels so that voice packets receive an optimum number of network resources. Default priorities are used when level of traffic is in a normal range. During times when network traffic is below the normal range, signaling data packets may be increased in priority and when network level of traffic is above the normal range, the priority of all data packets except for voice data packets will be decreased.

12 Claims, 6 Drawing Sheets

CALLING SERVICE OF A VOIP DEVICE IN A VLAN ENVIRONMENT

TECHNICAL FIELD

The invention relates in general to telecommunication networks and related applications and, in particular, to a method and system of modifying resources of data packets in a VLAN environment. More particularly, the invention relates to optimizing call service in a Voice over Internet Protocol (VoIP) device in a VLAN aware communications network.

BACKGROUND OF THE INVENTION

Without limiting the scope of the invention, its background is described in connection with modifying VoIP networks for communicating voice data over a data network. The transmission of analog voice over the Public Switch Telephone Network (PSTN) is slow being supplemented by other technologies, such as VoIP. The immediate goal for VoIP service providers is to reproduce existing telephone capabilities at a significantly lower "total cost of operation" and to offer technically competitive alternatives to the PSTN. It is the combination of VoIP with point of service applications that shows the greatest promise for the long term. VoIP provides a competitive threat to the providers of traditional telephone services that, at the very least, will stimulate improvements in cost and function throughout the industry.

Essentially, VoIP may be applied to almost any voice application including simple inter-office intercom to complex multi-point teleconferencing and shared screen environments. The quality of voice reproduction may also be tailored according to the application. For example, customer calls utilizing voice recognition may need to be of higher quality than internal paging over an overhead paging system. Hence, VoIP equipment must have the flexibility to cater to a wide range of configurations and environments and an ability to blend traditional telephony standards with VoIP.

Despite initial excitement among consumers for VoIP services, customers are worried over possible degradation in voice quality due to packetization of voice into voice packets. Whether these concerns are based on experience with early Internet telephony applications or whether they are based on understanding the nature of packet networks, voice quality is a crucial parameter in acceptance of VoIP services.

In addition, VoIP services need to be able to connect to traditional circuit switch voice networks. The International Telecommunications Union (ITU) has addressed this goal by defining H.323, a set of standards for packet based multimedia networks. The network is able to connect with other H.323 terminals or more traditional phone services such as PSTN, ISDN, or wireless phones. H.323 describes how multimedia communications occur between terminals, network equipment, and services on Virtual Local Area Network (VLANS) which often do not provide a guaranteed quality of service. Due to the support of personal computer, communication systems manufacturers and operating systems makers, H.323 has experienced rapid growth. H.323 compliance has been promoted and accepted by Internet phone and VoIP manufacturers as the standard for interoperability.

In a traditional network, groups of computers and other devices such as printers were located on a Local Area Network (LAN). Each of these devices is generally referred to as an end node device. Hubs, bridges or switches are used in the same physical segment or segments connecting all end node devices. End node devices can communicate with other end node devices on the same LAN without the need for a router.

Communications with end node devices on other LAN segments requires the use of a router. Specifically, each LAN is separated from another LAN by a router. As networks expand, more routers are need to separate users into LANs and provide connectivity to other LANS. One drawback to this design is that routers add latency, which essentially delays the transmission of data. One disadvantage to a LAN is that LANs are often setup based on location and geographic constraints. For example, in an office building, all the computers and printers on one floor may be members of one LAN while computers and printers on the second floor may be members of another LAN. However, in actual use, it may be advantageous to connect computers from the first floor with those from the second floor. Thus, it would be more convenient to be able to put all of the end node computers that need to talk to each other on the same LAN.

In an attempt to overcome the physical limitations of LANs, Virtual LANs (VLAN) were developed. For large numbers of VoIP devices, a VLAN is typically used. A VLAN can be viewed as a group of devices on different physical LAN segments which can communicate with each other as if they were all on the same physical LAN segment. VLANs provide a number of benefits over a LAN. Using VLANs, it is possible to group computing devices logically into a single broadcast domain. This allows us to define broadcast traffic for this VLAN to just those devices that need to see it and reduce traffic to the rest of the network. Also, connection speeds increase due to the elimination of latency from router connections. An additional benefit of increased security is realized if access from foreign networks is not allowed, i.e., those that originate from another subnet beyond the router.

In order to implement VLANS, IEEE has propagated Standard 802.1Q which defines the requirements for a VLAN network. Additionally, in order to add a priority to data packets flowing through the network, IEEE has propagated Standard 802.1D to specify a 3-bit priority code, which can be encoded into the Ethernet header of the data packet. The three-bit priority code represents numbers 0 through 7, thus creating 8 choices or 8 different priorities. In a VLAN network implementing IEEE Standards 802.1Q/D, a VLAN having packets of different priorities is enabled.

A disadvantage of the present VoIP devices is that priority is assigned to a default value of 6, regardless of other conditions in the network. This means that low priority tasks are treated the same as high priority tasks without regard to the availability of network resources and the amount of traffic in the network.

In summary, the prior art methods of routing voice data packets around a network do not provide flexibility and efficient use of network resources that is needed for today's networks. A system or method which overcomes these problems would have numerous advantages.

SUMMARY OF THE INVENTION

The present invention provides for a means for improving call service of a VoIP device in a VLAN environment. With the present invention, data packets are assigned to different priority values based on the traffic level in the VLAN. After receiving a data packet, a VoIP device monitors the level of traffic within the VLAN and makes decisions for data packet handling based on this traffic level. By adjusting the priority handling of data packets in the VLAN in relationship to the current traffic levels, the optimum number of network resources may be allocated for voice packets.

When the VoIP device determines that traffic levels are in a normal range, default priority values are assigned to all data packets. If the current traffic level falls below the normal range, the priority of signaling packets may be increased so that more VoIP phone calls may be placed. Finally, when the current traffic levels are above a normal range, the priority of all non-voice data packets may be decreased so that voice packets may proceed with less interference to their destination.

A technical advantage of the present invention is the ability to optimize voice packets and give them an optimal number of network resources so that they proceed with less interference and delay to their destination.

An additional technical advantage of the present invention is the ability to increase the number of calls possible during traffic levels that are below the normal range.

BRIEF DESCRIPTION OF THE DRAWINGS

For a more complete understanding of the present invention including its features and advantages, reference is made to the following detailed description of the invention, taken in conjunction with accompanying drawings of which.

Corresponding numerals and symbols in the figures refer to corresponding parts in the detailed description, unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of the specific ways to make and use the invention, and do not delimit the scope of the invention.

Figure 1:
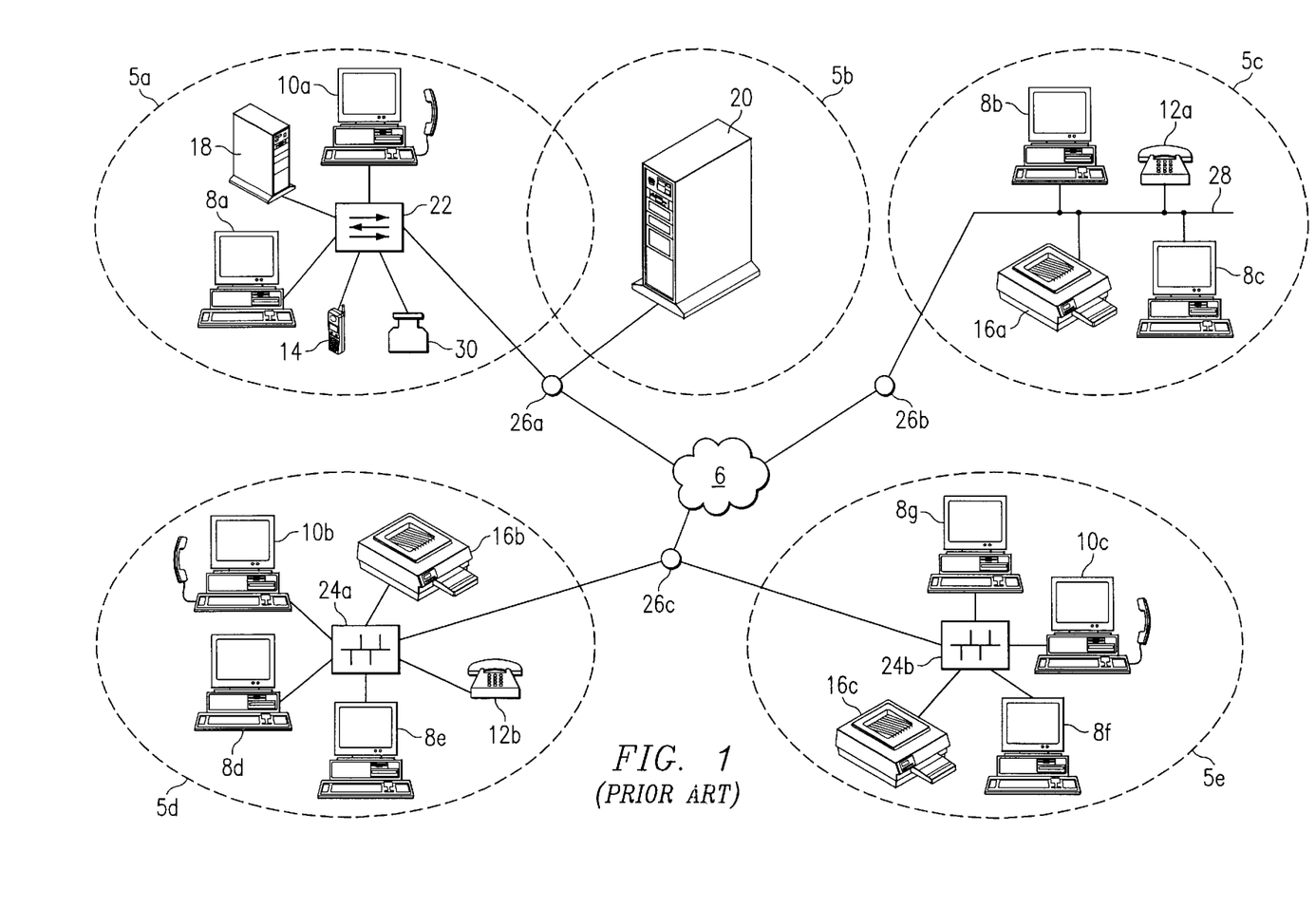
FIG. 1 depicts a network in which the LAN architecture of the prior art is shown.

To better understand the invention, reference is made to FIG. 1, wherein a diagram of a communications network 4 in which a traditional LAN implementation is shown. A LAN is generally defined as a broadcast domain. Hubs, bridges or switches in the same physical segment or LAN connect all end node devices in the LAN. End nodes in a LAN can communicate with each other without the need for a router. Typically, end node devices are personal computers, server computers, main frame computers, printers and other devices which may be connected to the network. Communications with devices on other LAN segments requires the use of a router.

As can be seen in FIG. 1, several LANs 5A–5E are connected to Wide Area Network (WAN) 6. Each LAN 5A–5E is connected to a router 26A–26C to join WAN 6. LAN 5A comprises several end nodes: a personal computer 8A, a server computer 18, a wireless voice over internet protocol (VoIP) phone 14, a personal digital assistant 30, and a personal computer with VoIP access 10A. Each of these end nodes are connected through switch 22 to router 26A to access other computers across WAN 6. LAN 5B comprises main frame computer 20, which is connected to WAN 6 through router 26A. Another LAN 5C is a thin Ethernet wire 28 connecting personal computer 8B, VoIP phone 12A, personal computer 8C and printer 16A to router 26B to access WAN 6. Another LAN is shown as 5D. LAN 5D comprises a printer 16B, a personal computer with VoIP access 10B, personal computers 8D and 8E, and VoIP phone 12B. These end nodes are connected through hub 24A to router 26C to access other LANs across WAN 6. Finally, LAN 5E comprises printer 16C, personal computers 8F and 8G, and personal computer with VoIP access 10C connected through hub 24B to router 26C to access computers across WAN 6.

A disadvantage of network 4 is that each separate LAN 5A–5E must connect through a router 26A–26C for computers within one LAN section to talk with computers in another LAN section. Routers add latency, which essentially delays the transmission of data. This is caused by the process involved in routing data from one LAN to another LAN. The router must use more of the information in a data packet to determine destinations and route the data to the appropriate end node.

Another disadvantage is that LAN segments are typically divided by physical location. This means that computers that are near each other in a building will be connected on the same LAN segment; however, these computers may not need to communicate with each other at all. The majority of their communication may be with computers in other LAN segments. If inter-LAN communication is excessive, it can slow down the entire network since packets must travel through routers for each communication to be made.

Figure 2:
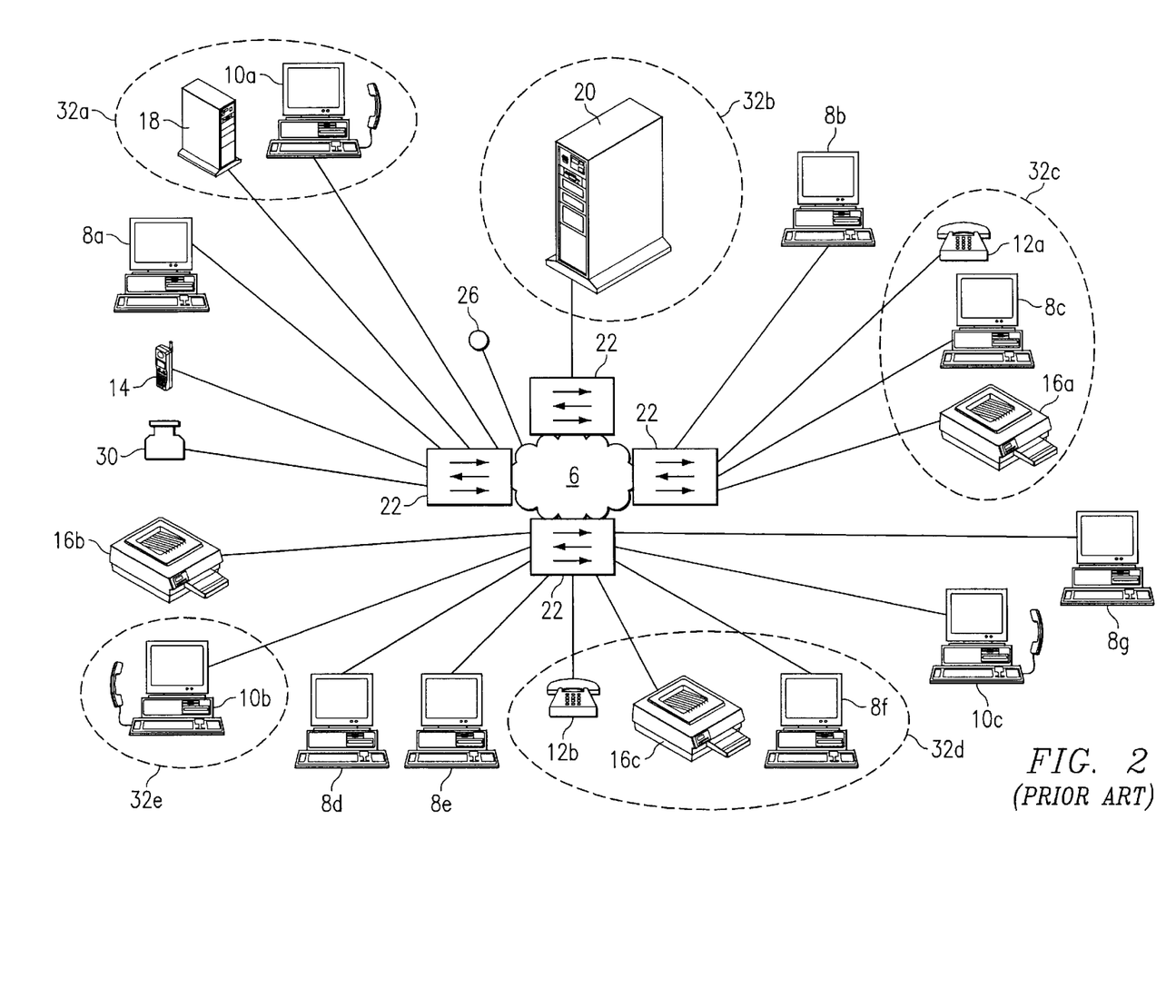
FIG. 2 depicts a network using a VLAN architecture of which an embodiment of the present invention may be implemented.

With reference to FIG. 2, therein is shown network 4 reconfigured to as a VLAN. Each end node is now connected to a switch 22 which provides connectivity to WAN 6. For access outside of WAN 6, router 26 will be utilized. However, for communications that stay within the local WAN 6, only the switches 22 will be used. Virtual LANs can be viewed as a group of devices on different physical LAN segments which communicate with each other as if they were all in the same physical LAN segment. Thus, VLAN 32A comprises server computer 18, personal computer with VoIP access 10A, VoIP telephone 12B, printer 16C, personal computer 8F, and personal computer with VoIP access 10B. Connecting these end node devices through VLAN 32A, the end node devices act as if they are on a single LAN segment. VLAN 32B is also depicted. VLAN 32B consists of main frame computer 20, personal computer 8C, printer 16A and VoIP telephone 12A.

In FIG. 1, LANs 5A–5E were grouped with physical location being the primary concern. In FIG. 2, VLANs 32A and 32B have been built with traffic patterns in mind. All of the end node devices in VLANs 32A, 32B have been grouped primarily on traffic patterns. Using VLANs, end node devices in VLAN 32A are grouped together to confine broadcast traffic to just those end node devices that need to see it, and to reduce traffic to the rest of the network 4. There is an increased connection speed due to the elimination of latency from router connections. Those skilled in the art will recognize that any combination of end nodes and switches could be utilized for network 4 and a VLAN. The specific example in FIG. 2 is for illustrative purposes.

Figure 3:
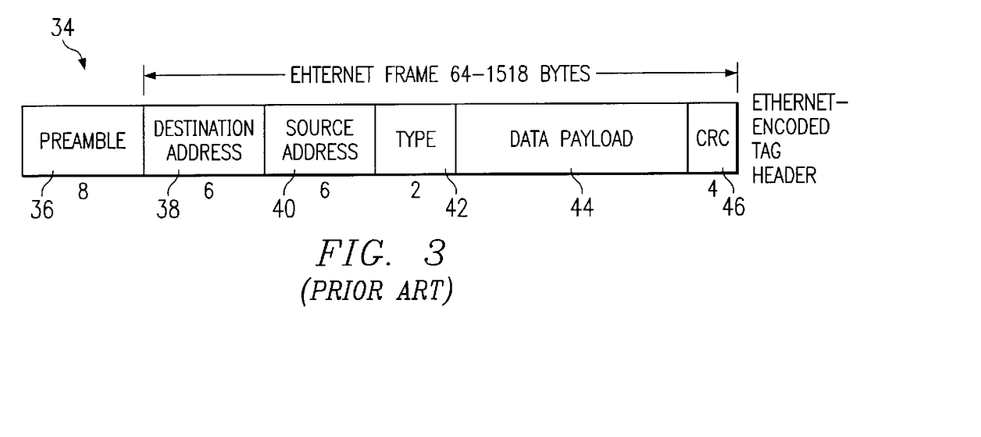
FIG. 3 depicts an Ethernet header, as described in the prior art.

In FIG. 3, a typical Ethernet header 34 is shown. An Ethernet header conforms to standards set up by IEEE Standard 802. Ethernet header 34 describes how information is packed into a data packet so that the information may be successfully deciphered. The first portion is called the preamble 36. Preamble 36 consists of 7 bytes of a synchronization pattern consisting of alternating 1s and 0s, which is used to ensure receiver synchronization. It also consists of one byte designated as the start frame delimiter. The start frame delimiter is similar to the other section of the preamble except that it ends with two consecutive bits set to one.

Next is the designation address 38. This is a 48-bit field which specifies to which station the packet is addressed. The first bit indicates the type of address: if it is a zero, the field gives the address of a unique station; if it is a one, the field specifies a larger group of recipients.

The next portion of the Ethernet header 34 is source address 40. Source address 40 is a unique address of the originating station as specified in this 48-bit field. Next comes the type 42. This two-byte field indicates the number of information bytes being supplied by the data field or the protocol type. Those skilled in the art will recognize that type 42 is sometimes referred to as length. Next is data payload 44. IEEE Standard 802 recommends that data payload 44 have a length between 46 and 1500 bytes. The 46-byte minimum ensures that valid packets will be distinguishable from collision fragments. If the data supplied is less than the 46-byte minimum required for proper information of the Ethernet protocol, then an integer number of padding bytes are added to the end of the data field to bring the length to 46 bytes.

The last field is the Cyclic Redundancy Check (CRC) 46 field. This field is also referred to as the frame check sequence. CRC 46 contains a 32-bit cyclic redundancy check code for error detection, as defined by the generating polynomial G(x). CRC 46 covers the destination address, source address, and data fields. CRC 46 algorithm uses a linear feedback register which is initially preset to all ones. After the last bit is transmitted, the contents of this register are inverted and sent as the CRC 46 field.

Figure 4:
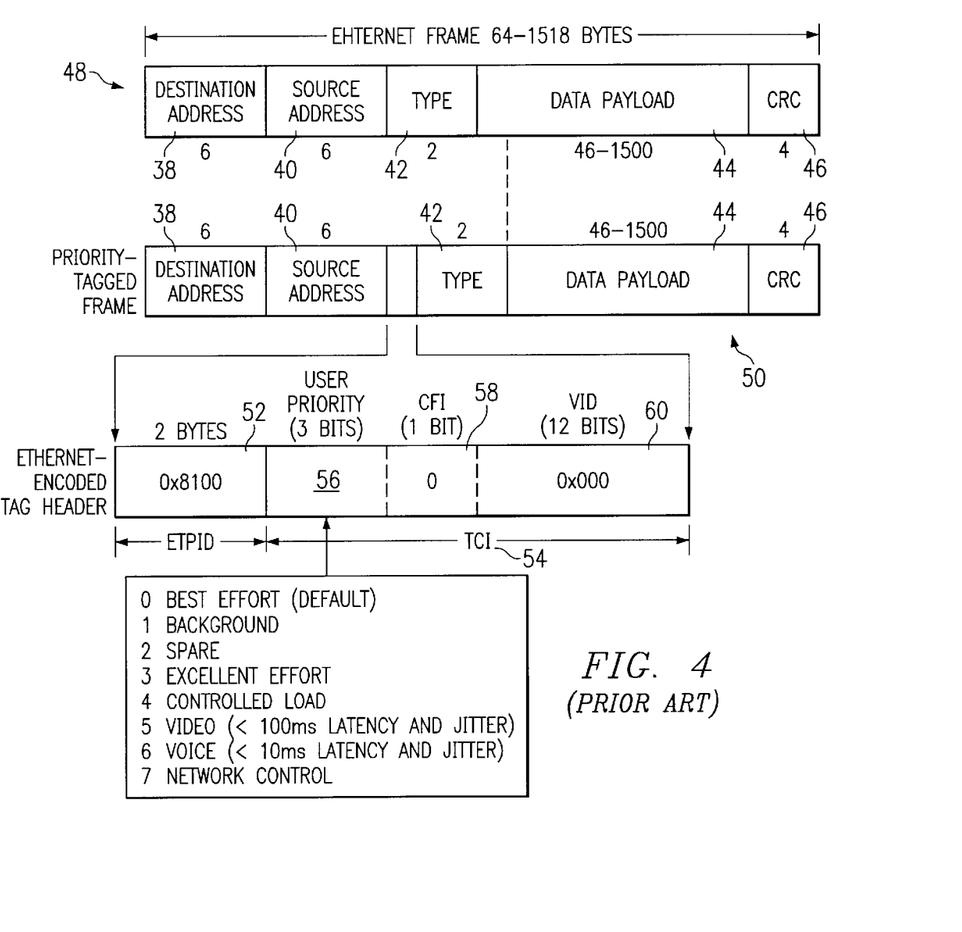
FIG. 4 depicts an Ethernet frame and a prior art priority tagged Ethernet frame, as is described in the prior art.

An Ethernet frame is defined as all the sections of an Ethernet header except for the preamble 36. In FIG. 4, Ethernet frame 48 is depicted. Ethernet frame 48 includes destination address 38, source address 40, type 42, data payload 44 and CRC 46. In priority tagged frame 50, priority and VLAN identifier data are added. Priority tagged frame 50 comprises destination address 38, source address 40, Ethernet Tag Protocol Identifier (ETPID) 52, Tag Control Information (TCI) 54, type 42, data payload 44, and CRC 46. ETPID 52 is used to identify the proper protocol and implement it. In this example, it is a value of 0×8100.

The Tag Control Information 54 is comprised of three separate pieces of information. First is the priority 56. Priority 56 is made up of a three-bit designation. Since three bits will allow eight different values, eight different priorities are available which are represented by priorities 0 through 7. The eight different priority fields 56 are as follows: 0, best effort; 1, background; 2, spare; 3, excellent effort; 4, controlled load; 5, video; 6, voice; and 7, network control.

Next, if Canonical Format Indicator (CFI) 58 is set, the E-RIF field is present and the bit determines whether mac address information carried by the frame is in canonical or non-canonical format. If CFI 58 is not set, it indicates that the E-RIF field is not present and that all mac information carried by the frame is in canonical format. Finally, the VLAN Identifier (VID) 60 is used to uniquely identify the VLAN to which the frame belongs. A null value indicates that the tag header contains only user priority information and no VLAN ID.

Figure 5:
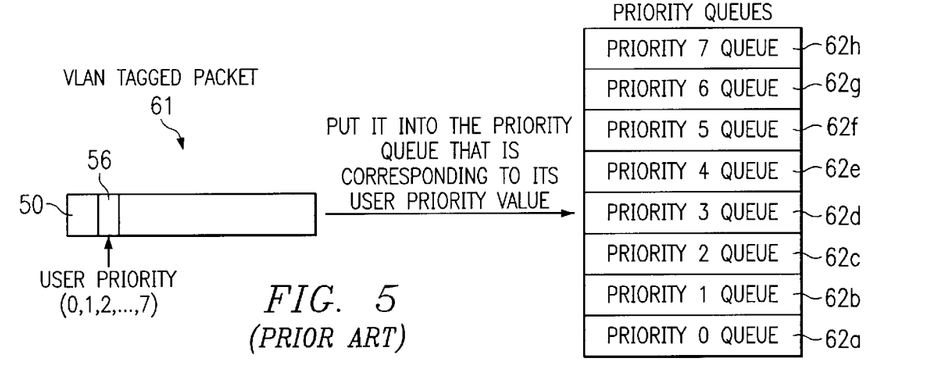
FIG. 5 depicts a VLAN-tagged packet with a priority code being used to decide what priority queue data packets should go into, according to the prior art.

Referring to FIG. 5, data packet 61 is shown with a VLAN tag frame 50. Data packet 61 has a priority 56 which determines which of the 8 priority queues 62A–62H data packet 61 will be put into as it traverses network 4. According to IEEE Standard 802.1Q/D, the priority value is set in the packet and may not be changed; thus, whatever priority value the packet has when it begins its journey, it will be placed in that priority queue in all VLAN-compatible queues along the route.

Figure 6:
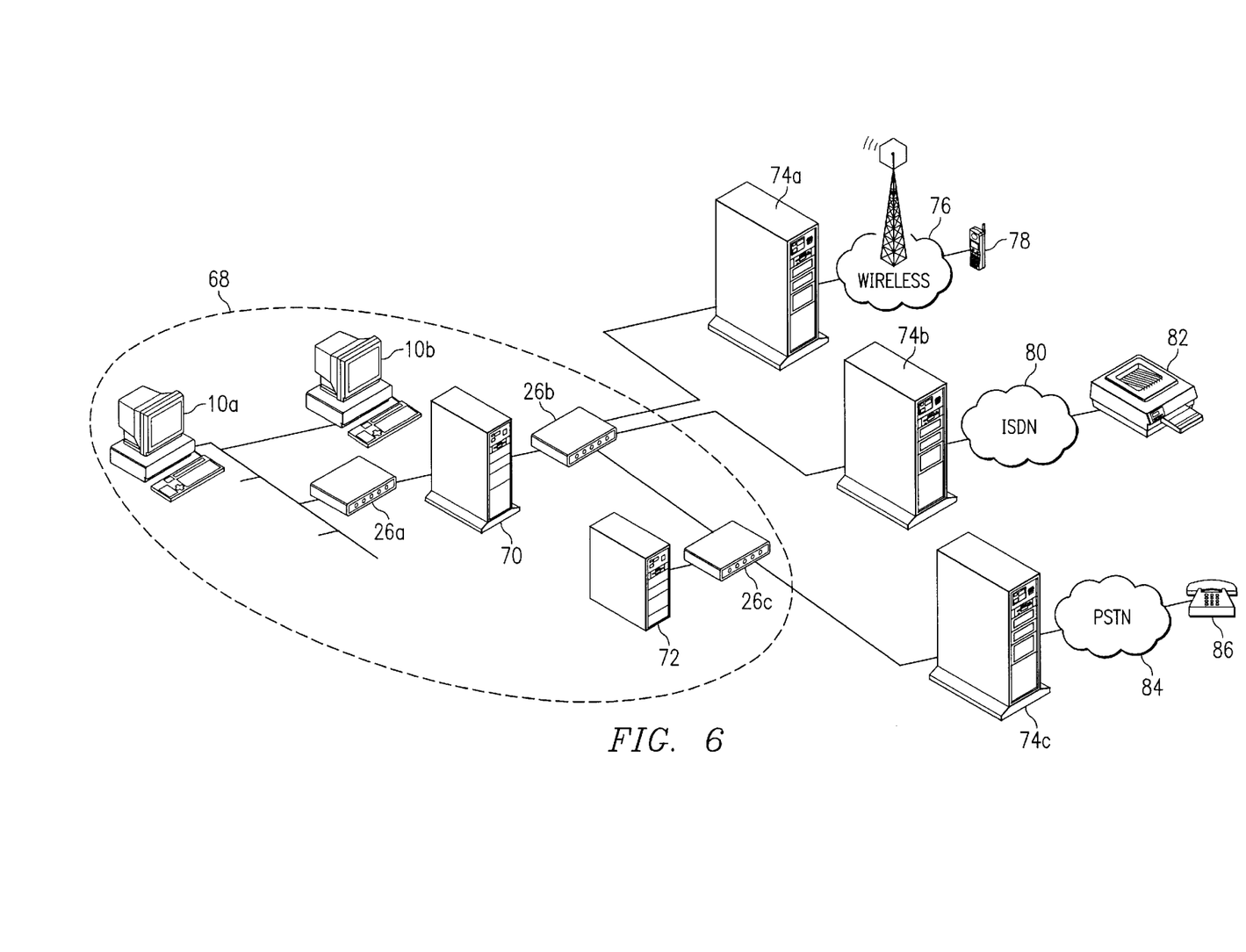
FIG. 6 is a VoIP network in which the present invention may be practiced.

FIG. 6 illustrates a network in which an embodiment of the invention may be practiced. Personal computers with VoIP access 10A and 10B are connected to router 26A. Router 26A is connected to gatekeeper 70 and then connected to router 26B. A Multi-point Control Unit (MCU) 72 is connected to router 26C. Routers 26B and 26C are connected to each other and connect to traditional telephone networks. Router 26B is connected to gateway 74A, which provides access to wireless network 76 so that a wireless telephone 78 may be accessed. Gateway 74B provides access from the VoIP network 68 to an Integrated Services Digital Network (ISDN) 80 so that digital telephone 82 may be accessed. Router 26C provides access to gateway 74C, which is connected to the Public Switch Telephone Network (PSTN) 84 to access to analog telephone 86.

Although there are many different types of VoIP access, the preferred implementation uses H.323 standards. H.323 defines four major components: terminals, gateways 74, gatekeepers 70 and multi-point control units 72. Terminals are the client end points on the network that provide Real-Time, two-way communications. All H.323 terminals must support voice communications; video and data support are optional under H.323. H.323 terminals are represented by personal computers with VoIP access 10A and 10B.

Gateway 74 is an optional element under H.323 that provides many services, the most common being a translation function between H.323 conferencing end points and other terminal types. This function includes translation between transmission formats and communication procedures. In addition, gateway 74 also translates between both audio and video codecs and performs call setup and clearing on both the VLAN side and the switch circuit network side. Codec stands for Compression and Decompression Code. A codec defines a protocol to allow data to be compressed and decompressed for transmission in a network. In general, the purpose of gateway 74 is to reflect the characteristics of a VLAN end point, such as personal computer with VoIP access 10A, to a switched circuit network end point, analog telephone 86 for example, and vice versa.

The primary application of gateways 74 are likely to be: establishing links with an analog PSTN terminal; establishing links with remote H.320 compliant terminals over ISDN-based switch circuit networks and establishing links with remote H.324 compliant terminals over PSTN networks. Gateways 74 are not required if connections to other networks are not needed since the end point may directly communicate with other end points on the same VLAN. Terminals communicate with gateways 74 using H.245 and Q.931 protocols.

A gatekeeper 70 is the most important component of an H.323 enabled network. It acts as the central point for all calls within its zone and provides call control services to registered end points. In many ways, an H.323 gatekeeper acts as a virtual switch. Gatekeepers 70 perform two important call control functions. The first is address translation from VLAN aliases for terminals and gateways 74 to IP or IPX addresses, as defined in the RAS specification.

The second function is bandwidth management, which is also designated within RAS. For instance, if a network manager has specified a threshold for the number of simultaneous conferences on the VLAN, the gatekeeper 70 can refuse to make any more connections once the threshold is reached. The effect is to limit the total conferencing bandwidth to some fraction of the total available. The remaining capacity is left for e-mail, file transfers, and other VLAN protocols. The collection of all terminals, gateways 74 and MCUs 72 managed by a single gatekeeper 70 is known as an H.323 zone. Another valuable feature of the gatekeeper 70 is its ability to route H.323 calls. By routing the call through a gatekeeper 70, calls can be controlled more effectively. Service providers need this ability in order to bill for calls placed through the network. This service can also be used to re-route a call from another end point if a called end point is unavailable.

The MCU 72 supports conferences between three or more end points. Under H.323, an MCU 72 consists of a Multi-point Controller (MC), which is required in Multi-point Processors (MP). The MC handles H.245 negotiations between all terminals to determine common capabilities for audio and video processing. The MC also controls conference resources by determining which, if any, of the audio and video streams will be multi-cast.

According to the preferred embodiment of the invention, a module is placed in gatekeeper 70. The module examines the network traffic load and if network traffic is in a normal range, it will leave the default priority values of each data packet. If the network traffic is below the normal range, it will increase the priority on signaling packets so that more calls may be initiated. Accordingly, if network traffic is above the normal range, the module will decrease the priority of all data packets except for voice type data packets to enable voice calls to flow more smoothly to their destination.

Figure 7:
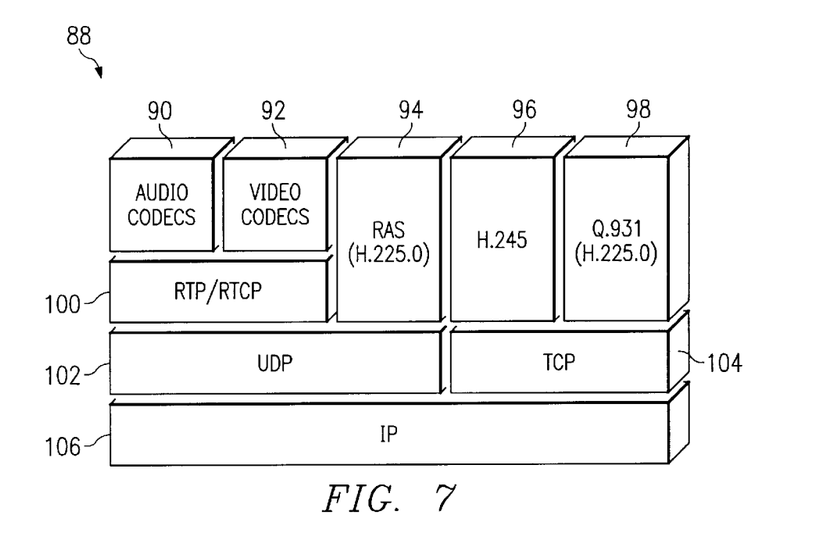
FIG. 7 illustrates an H.323 protocol stack for allowing VoIP calls to be placed over an IP network, as utilized by the invention.

In FIG. 7, the protocol stack 88 required by H.323 is shown. Audio codec 90 is a code used to specify compression of the audio data. Those skilled in the art will recognize that G.723 and G.729 are often the preferred audio codecs. Video codec 92 is used under H.323 to decompress and compress video information. As can be seen, audio codec 90 and video codec 92 are carried over the Real-Time Protocol (RTP) 100 layer. Those skilled in art recognize that media is carried over UDP layer 102 since this is the more unreliable layer. The media contained in audio codec 90 and video codec 92 is carried over UDP 102 because it would not make sense for it to be retransmitted if a media packet is lost. Should a lost sound fragment be retransmitted, it would most probably arrive too late to be of any use in voice reconstruction. The Q.931 signaling information 98 and H.245 96 capability exchange are carried on the TCP layer 104 so that control packets can be retransmitted, if necessary, to ensure that control instructions arrive at the destination. All the information is then transferred on the IP layer 106, as is familiar to those skilled in the art.

Figure 8:
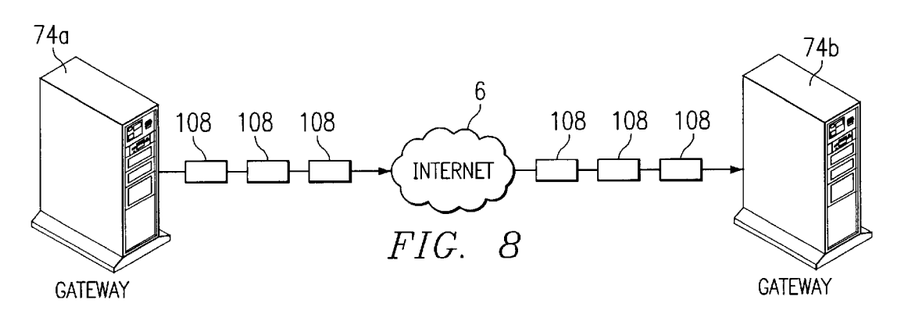
FIG. 8 depicts data packets experiencing latency between two gateways.

There are several factors that effect voice quality. One is the choice of an audio codec 90. In addition, latency, jitter, and packet loss may also effect voice quality in the VoIP network 68. FIG. 8 shows typical data packets 108 crossing network from gateway 74A to gateway 74B. As can be seen, the data packets 108 are evenly spaced out in time intervals when they leave gateway 74A. However, in passing through a wide area network 6, such as the Internet, some of the data packets 108 become closer and farther apart, as can be seen as the data packets 108 approach gateway 74B. While this is not important in file transfer or e-mail applications, in voice applications, it can become very bothersome. Callers start feeling uneasy holding a two-way conversation and usually end up talking over each other. In addition, it becomes difficult to understand some words as they may be placed together in a jumbled and uneasy format.

In order to reduce the jitter that can be created by packets arriving at uneven intervals, a jitter buffer may be used to compensate for fluctuating network conditions. A jitter buffer holds incoming packets for a specified amount of time before forwarding them to decompression. It has the effect of smoothing the packet flow, increasing the resiliency of audio codec 90 to packet loss, delayed packets and other transmission effects. However, the down side of jitter buffer is that it can add significant delay. Because it's important to try and minimize latency in jitter, it is important to optimally use the network resources so that calls may be placed as smoothly as possible.

Figure 9:
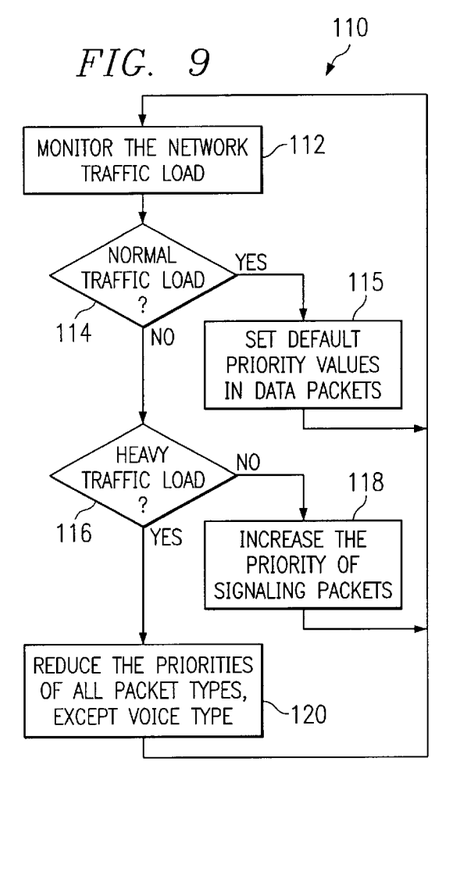
FIG. 9 depicts a flow diagram for program product, according to an embodiment of the present invention.

FIG. 9 illustrates a high-level logic flow diagram 120 illustrating process steps for implementing the method and system of the present invention, in accordance with a preferred embodiment of the present invention. It can be appreciated by those skilled in the art that FIG. 9, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a VLAN-aware device, instructions implementing these method steps. Such instructions can be maintained within other computer memory locations. Implementation of the method described herein is left to the discretion of a particular VLAN-aware device designer.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 9. While the present invention is described in the context of a fully functional communications network 4, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Figure 10:
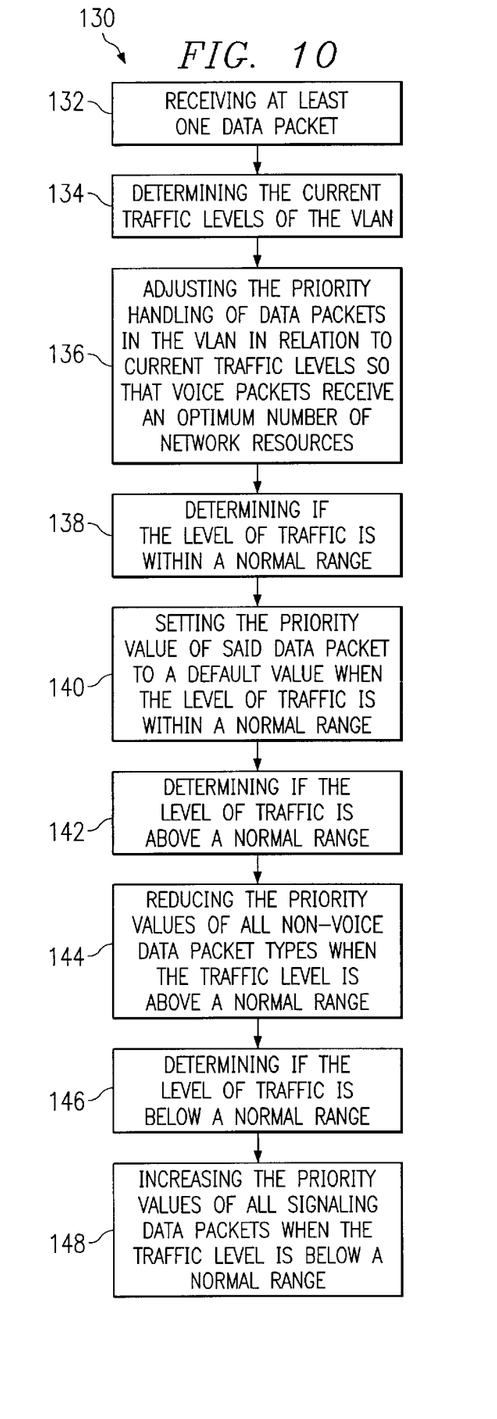
FIG. 10 is a flow chart depicting a method, according to an embodiment of the present invention.

Preferred implementations of the invention can include implementations to execute the methods of FIGS. 9 and 10 as described herein in the form of a program product residing in memory of microcomputer. Alternatively, a preferred embodiment of the present invention can include a program product residing in a microcomputer memory located at an VLAN-aware device such as switch 22. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a VLAN-aware device by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

In FIG. 9 is shown a diagram of an embodiment of the program product 110. Program product 110 first has a logic means for determining the current traffic levels of the VLAN. Next, program product 110 uses logic means for adjusting the priority handling of data packets in the VLAN in relationship to the current traffic levels so that voice packets receive an optimum number of network resources. Program product 110 also comprises a logic means for determining if the traffic level is within a normal range 114. A normal range may be defined by a system administrator, depending on the current needs of the system, as is familiar to those skilled in the art. If the traffic load is in a normal range, program product 110 uses a logic means for setting the priority values of the data packets to a default value 115. If the flow of traffic is not in a normal range, the program product 110 then has to determine if it has a heavy traffic load 116 using a logic means to determine if the level of traffic is above the normal range. If the level of traffic is above the normal range, it will then use level of logic means for reducing the priority on all packet types except voice data packets 120. If the program product 110 determines that the flow of traffic is below the normal range, it will then use a logic means for increasing the priority of signaling packets 118. By increasing the priority of signaling packets, more calls may be placed when network traffic is at a lull.

In FIG. 10, a logic flow diagram of a method 130 is depicted. In step 132, a data packet is received. Next, in step 134, the current traffic level of the VLAN is determined. In step 136, priority handling of data packets allows for priority to be adjusted according to current traffic levels so that voice packets receive an optimum number of network resources. Step 138 is determined if the level of traffic is within a normal range. In step 140, if the level of traffic is within a normal range, the priority value of data packets is set to a default value. In step 142, if the level of traffic is above the normal range is determined. Next, in step 144, if the traffic level is above the normal range, the priority is reduced on all non-voice data packet types. Next, in step 146, it is determined if the level of traffic is below the normal range. And finally, in step 148, if the level of traffic is below a normal range, signaling data packets are increased in priority to allow more phone calls to be placed.

What is claimed is:

1. A method of optimizing call service in a virtual local area network (VLAN) including at least one voice over internet protocol (VoIP) device, the method comprising the steps of:

determining whether current traffic levels of the VLAN are within a normal range, wherein if the traffic levels are below the normal range, increasing priority on signaling packets in order to inmate more voice calls; and if the traffic levels are above the normal range, decreasing the priority of all non-voice data packets.

2. The method of claim 1 wherein the step of determining the current traffic levels of the VLAN is preceded by the step of a VLAN aware device receiving at least one data packet.

3. The method of claim 1 wherein said step of determining if the level of traffic is within a normal range is followed by the step of setting the priority value of said data packets to a default value when the level of traffic is within a normal range.

4. The method of claim 1 further comprising adjusting the priority handling of the data packets in the VLAN in relation to the current traffic levels so that voice data packets receive an optimum number of network resources.

5. In a voice over internet protocol (VoIP) device, a module for optimizing call service in a virtual local area network (VLAN), the module comprising:

means for determining whether a current traffic level of the VLAN, is within a normal range, wherein if the traffic levels are below the normal range, means for increasing priority on signaling packets in order to initiate more voice calls; and if the traffic levels are above the normal range, means for decreasing the priority of all non-voice data packets.

6. The module of claim 5 wherein said means for determining whether the current traffic level is within a normal range further comprises means for setting the priority value of each data packet to a default value when the level of traffic is within a normal range.

7. The module of claim 5, wherein said means for adjusting the priority handling of the data packets in the VLAN further comprises means for ensuring that voice data packets receive an optimum number of network resources.

8. The module of claim 5 wherein said means for determining the current traffic level of the VLAN further comprises means for determining if the level of traffic is below a normal range.

9. In a voice over Internet protocol (VoIP) device, a computer program product for optimizing call service in a virtual local area network (VLAN), said program product comprising:

logic means for determining whether a current traffic level of the VLAN, is within a normal range, wherein if the traffic jewels are below the normal range, logic means for increasing priority on signaling packets in order to initiate more voice calls; and if the traffic levels are above the normal range, logic means for decreasing the priority of all non-voice data packets.

10. The computer program product of claim 9 wherein said logic means for determining whether the current traffic level is within a normal range further comprises logic means for setting the priority value of said data packet to a default value when the level of traffic is within a normal range.

11. The computer program product of claim 9 wherein said logic means for determining the current traffic levels of the VLAN further comprises logic means for determining if the lever of traffic is above a normal range.

12. The computer program product of claim 9 wherein said logic means for determining the current traffic levels of the VLAN further comprises logic means for determining if the level of traffic is below a normal range.

* * * * *

UNITED STATES PATENT AND TRADEMARK OFFICE
CERTIFICATE OF CORRECTION

| | | |
|---|---|---|
| PATENT NO. | : 6,781,955 B2 | Page 1 of 1 |
| APPLICATION NO. | : 09/752005 | |
| DATED | : August 24, 2004 | |
| INVENTOR(S) | : Mun Keung Leung | |

It is certified that error appears in the above-identified patent and that said Letters Patent is hereby corrected as shown below:

Please Insert
Claim 1, line 41, Col. 10

A method of optimizing call service in virtual local area network (VLAN) including at least one voice over internet protocol (VoIP) device, the method comprising the steps of:
   determining whether current traffic levels of the VLAN are within a normal range, wherein if the traffic levels are below the normal range, increasing priority on signaling packets in order to --initiate-- "inmate" more voice calls; and
   if the traffic levels are above the normal range, decreasing the priority of all non-voice data packets.

Signed and Sealed this

Twelfth Day of December, 2006

JON W. DUDAS
*Director of the United States Patent and Trademark Office*